United States Patent
Han et al.

(10) Patent No.: US 8,384,847 B2
(45) Date of Patent: Feb. 26, 2013

(54) PRISM SHEET HAVING WET-OUT PROPERTY AND LCD BACK LIGHT UNIT THEREBY

(75) Inventors: Young Soo Han, Gyeonggi-do (KR);
Seok Hoon Jang, Gyeonggi-do (KR);
Jun Hyeak Choi, Gyeonggi-do (KR);
Man Suk Kim, Gyeonggi-do (KR); Kyu Ha Chung, Gyeonggi-do (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 389 days.

(21) Appl. No.: 12/451,706

(22) PCT Filed: Nov. 26, 2007

(86) PCT No.: PCT/KR2007/005973
§ 371 (c)(1),
(2), (4) Date: Nov. 25, 2009

(87) PCT Pub. No.: WO2008/147002
PCT Pub. Date: Dec. 4, 2008

(65) Prior Publication Data
US 2010/0103351 A1    Apr. 29, 2010

(30) Foreign Application Priority Data
May 25, 2007  (KR) .................. 10-2007-0050855

(51) Int. Cl.
*G02F 1/1335* (2006.01)
(52) U.S. Cl. .......................................... 349/65; 349/61
(58) Field of Classification Search .................... 349/61, 349/65
See application file for complete search history.

(56) References Cited

U.S. PATENT DOCUMENTS

| | | | |
|---|---|---|---|
| 6,540,382 B1 * | 4/2003 | Simon | 362/339 |
| 6,827,458 B2 * | 12/2004 | Suga | 362/609 |
| 7,154,572 B2 * | 12/2006 | Lee et al. | 349/61 |
| 7,269,327 B2 * | 9/2007 | Tang | 385/146 |
| 7,269,328 B2 * | 9/2007 | Tang | 385/146 |
| 7,545,569 B2 * | 6/2009 | Cassarly | 359/628 |
| 7,991,257 B1 * | 8/2011 | Coleman | 385/129 |
| 2004/0051825 A1 * | 3/2004 | Lee et al. | 349/65 |
| 2005/0280752 A1 * | 12/2005 | Kim et al. | 349/62 |

(Continued)

FOREIGN PATENT DOCUMENTS

| | | |
|---|---|---|
| JP | 6-82635 A | 3/1994 |
| JP | 2005-085671 A | 3/2005 |
| JP | 2006-331958 A | 12/2006 |
| KR | 10-2007-0013573 A | 1/2007 |

*Primary Examiner* — K. Cyrus Kianni
(74) *Attorney, Agent, or Firm* — Lee & Morse, P.C.

(57) ABSTRACT

A prism sheet, capable of enhancing wet-out ability in a whole back light unit while maintaining center brightness, transmittance and haze in good condition, is disclosed. The prism sheet includes a base film made of a transparent material and having a flat first surface, and a light refracting part including a plurality of unit prisms unitarily formed with the base film on a second surface of the base film, opposite to the flat first surface. The unit prisms have a predetermined shape of a cross section, and are arranged with orientation. When an angle formed between a ridge of the unit prism of the light refracting part and a normal line of the flat first surface is defined as $\theta_n$, $\theta_n$ and $\theta_{n+1}$ have different values from each other, and n is an integer more than 2. An LCD back light unit using the above prism sheet is also disclosed.

18 Claims, 4 Drawing Sheets

U.S. PATENT DOCUMENTS

| | | | |
|---|---|---|---|
| 2006/0050200 A1* | 3/2006 | Nagao | 349/65 |
| 2006/0221270 A1* | 10/2006 | Ioki et al. | 349/61 |
| 2007/0046856 A1* | 3/2007 | Lee et al. | 349/61 |
| 2007/0121227 A1* | 5/2007 | Wang et al. | 359/831 |
| 2009/0290098 A1* | 11/2009 | Ogawa | 349/67 |
| 2010/0103351 A1* | 4/2010 | Han et al. | 349/65 |
| 2010/0302479 A1* | 12/2010 | Aronson et al. | 349/64 |

* cited by examiner

FIG. 1

(Related Art)

PRISM SHEET HAVING WET-OUT PROPERTY AND LCD BACK LIGHT UNIT THEREBY

TECHNICAL FIELD

The present invention relates to a prism sheet and a liquid crystal display (LCD) back light unit using the same, and more particularly, to a prism sheet and an LCD back light unit using the same, which can easily discharge moisture existing in a light guide plate, by modifying ridges of a plurality of unit prisms included in a prism sheet used in a conventional LCD back light unit to have a predetermined inclination with respect to a flat bottom surface.

BACKGROUND ART

In general, a liquid crystal display (hereinafter, referred to simply as an "LCD") device refers to a device which displays numerals or images through application of an electric field to liquid crystals disposed between two glass substrates formed with electrodes, in which the liquid crystals are made of a material having an intermediate phase between a liquid and a solid.

Since the LCD device is not a self-luminescent device, it must be provided with a back light unit as a light source to generate light. An image is displayed in such a manner that transmittance of light generated from the back light unit is adjusted in a liquid crystal panel, in which liquid crystals are uniformly arranged.

Figure 1:
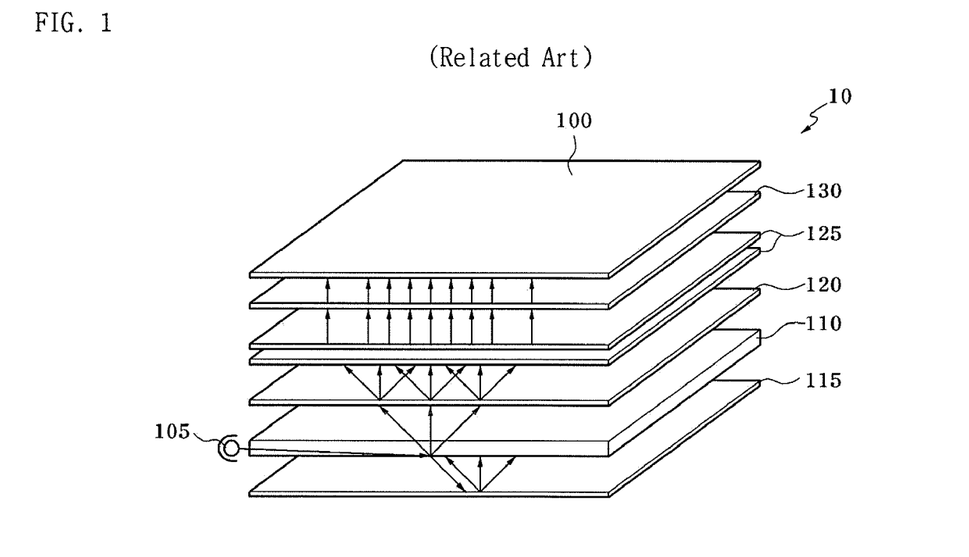
FIG. 1 is an exploded perspective view showing a back light unit of a conventional LCD device.

FIG. 1 is an exploded perspective view showing a back light unit of a conventional LCD device.

As shown in FIG. 1, a conventional LCD back light unit includes a light source 105, a light guide plate 110, a reflection plate 115, a diffusion sheet 120, prism sheets 125 and a protective sheet 130. The above components are assembled in a unitary form by a case (not shown).

The light source 105 serves to emit light initially in the LCD device. Various types of light sources can be used, however the LCD device generally employs a cold cathode fluorescence lamp (CCFL) as the light source 105, which has a low power consumption and emits very bright white light.

The light guide plate 110 is provided below an LCD panel 100 and near one side of the light source 105. The light guide plate 110 serves to convert spot light generated from the light source 105 into plane light and then project the plane light forward to the LCD panel.

The reflection plate 115 is provided on a rear side of the light guide plate 110. The reflection plate 115 serves to reflect light emitted from the light source 105 toward the LCD panel 100 disposed in front of the reflection plate 115.

The diffusion sheet 120 is provided on a front side of the light guide plate 110. The diffusion sheet 120 serves to uniformize light passing through the light guide plate 110.

While passing through the diffusion sheet 120, the light is diffused in horizontal and vertical directions, and brightness is rapidly deteriorated. In this regard, the prism sheets 125 are used to refract and concentrate the light, to thereby enhance brightness. One prism sheet or two prism sheets, which are arranged in the perpendicular direction to each other, can be used.

The protective sheet 130 is provided above the prism sheets 125. The protective sheet 130 serves to prevent scratches on the prism sheets 125, and to prevent the Moire effect from occurring when using the prism sheets 125 arranged in two layers in the vertical and horizontal directions.

The above-described components of the back light unit are stacked on each other by adhesion, and are sealingly assembled in the case (not shown) in a high vacuum state.

However, moisture may permeate the back light unit assembled with the panel through a gap of the case while the back light unit is used for a long period, or while the sealing process is carried out. If the moisture gathers on a certain portion of the back light unit, refraction or diffusion of light occurs at the moisture-gathering portion, which causes deterioration of visibility or light concealing property of the back light unit.

Because the components of the back light unit are mostly configured such that their both sides, which are stacked on each other, are formed in a flat shape, it is difficult to form a structure for exhausting moisture at the components of the back light unit.

In this regard, the present invention relates to a technique of facilitating the discharge of moisture existing in the back light unit, by applying other technical ideas to the prism sheets 125 provided with a concave/convex shaped prism pattern on one side.

DISCLOSURE

Technical Problem

Therefore, the present invention has been made in view of the above problems, and it is an object of the present invention to provide a prism sheet capable of easily discharging moisture existing in the back light unit.

It is another object of the present invention to provide an LCD back light unit using the aforementioned prism sheet.

The objects to be accomplished by the present invention are not limited to the above objects, and other objects will be clearly understood by a person skilled in the art from the following detailed description.

Technical Solution

In accordance with an aspect of the present invention, the above and other objects can be accomplished by the provision of a prism sheet comprising: a base film made of a transparent material, the base film having a flat first surface; and a light refracting part including a plurality of unit prisms unitarily formed with the base film on a second surface of the base film, opposite to the flat first surface, the unit prisms having a predetermined shape of a cross section and being arranged with orientation. When an angle formed between a ridge of each of the unit prisms of the light refracting part and a normal line of the flat first surface is defined as $\theta_n$, $\theta_n$ and $\theta_{n+1}$ have different values from each other, and n is an integer more than 2.

In accordance with another aspect of the present invention, there is provided an LCD back light unit comprising: a light guide plate; a light source disposed at a side surface or a rear surface of the light guide plate; and the aforementioned prism sheet formed on a surface of the light guide plate, from which light progresses.

Advantageous Effects

According to the embodiment of the present invention, the prism sheet having functions of refracting light and discharging moisture existing in the back light unit can be manufactured. Accordingly, the prism sheet can effectively discharge moisture existing in the back light unit while maintaining brightness, transmittance and haze substantially equal to that of a conventional prism sheet. As a result, the light guide plate for use in an LCD back light unit capable of minimizing image mottle, which would be generated due to moisture, can be manufactured. Further, since the light diffusing elements can be formed at the prism sheet having such an excellent wet-out property, it is possible to eliminate a diffusion sheet used in the prior art. Accordingly, manufacturing costs can be saved, and the light guide plate can be decreased in thickness.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the annexed drawings.

The advantages, features and methods for accomplishing embodiments of the present invention will be more clearly understood from the following detailed description taken in conjunction with the accompanying drawings. The present invention is not limited to the embodiments disclosed below, and may be carried out in other specific ways. The following description will be given in detail so as to allow those skilled in the art to easily understand and realize the present invention through the preferred embodiments. The scope of the present invention should be defined by the accompanying claims and equivalents thereof. The same reference numerals will be used throughout the specification to refer to the same or like parts.

For clear description of the present invention, components constituting the present invention are exaggeratedly illustrated in the drawings. In the following description, if one component is expressed to be "provided within" or "connected with" another component, it means that the component may be mounted in contact with the other component or may be mounted at a predetermined distance from the other component. In a case where the component is mounted at a predetermined distance from the other component, it should be noted that explanation of a third component used to fix or connect the component to the other component may be omitted.

Figure 2:
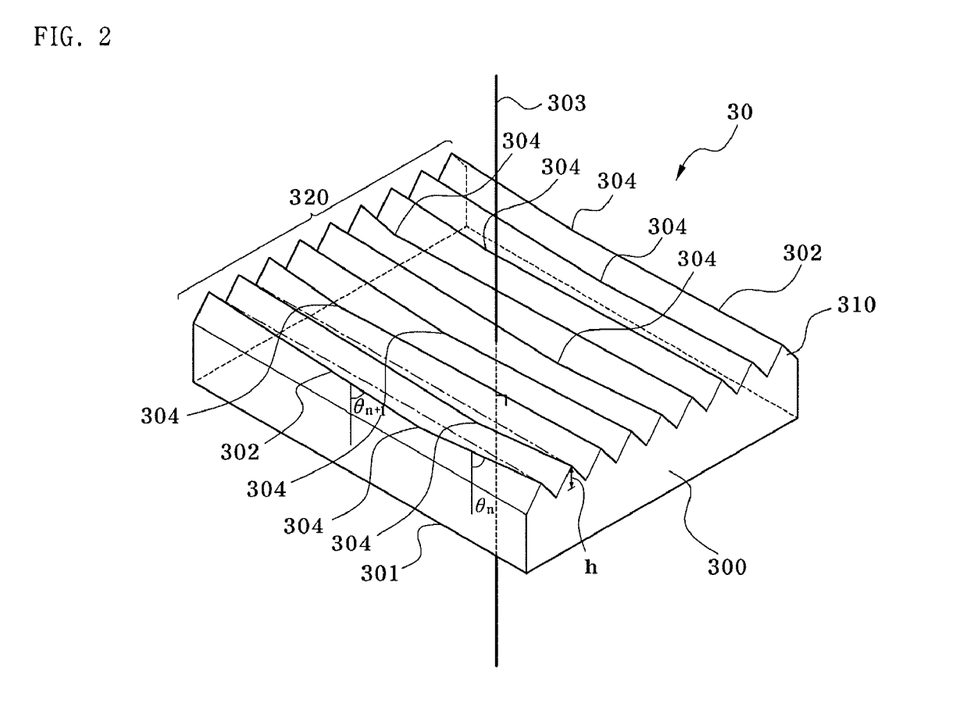
FIG. 2 is a perspective view showing a prism sheet according to an embodiment of the present invention.

FIG. 2 is a perspective view showing a prism sheet according to an embodiment of the present invention.

As shown in FIG. 2, a prism sheet 30 according to the embodiment of the present invention includes a base film 300 which has a flat first surface 301 and a second surface opposite to the first surface 301. A light refracting part 320 is formed on the second surface of the base film 300, in which a plurality of unit prisms 310 having a triangle-shaped cross section are arranged in one direction.

The base film 300 serves as a base layer of the prism sheet. The base film 300 is generally made of a transparent material, such as transparent synthetic resin (e.g., polyethylene, polypropylene or polycarbonate), glass, metallic thin film, etc.

A thickness of the base film 300 is not certainly limited, however the thickness is generally several micrometers ($\mu$m).

The light refracting part 320 serves to refract the light transmitting through the base film 300, to thereby provide the light with uniform orientation. The light refracting part 320 is formed on the second surface of the base film 300.

In the present invention, the light refracting part 320 is configured as the prism form having the triangle-shaped cross section.

In other words, the second surface of the base film 300 is formed with the light refracting part 320 which includes a plurality of unit prisms 310 to refract the light transmitting the base film 300 in a predetermined direction.

Although it is illustrated in FIG. 2 that each of the unit prisms 310 of the light refracting part 320 has a triangle-shaped cross section and has a trigonal prism shape as a whole, the shape of the cross section of the unit prisms 310 of the light refracting part 320 is not limited to the triangular shape. The unit prisms having a cross section of a semicircular shape (which is also called a semicylindrical shape or a lenticular shape) or any other shape capable of refracting light can be applied to the present invention. For instance, the unit prisms can be configured as a transparent member having at least two optical planes capable of refracting light, in which at least one pair of surfaces of the optical planes are not parallel with each other, such as a cross section of a trapezoidal shape.

When manufacturing the prism sheet 30 of the present invention, the determination of the shape of the cross section of the unit prisms 310 depends on features of a device to which the prism sheet is applied in practice, a required sight angle, a screen size, etc.

The light refracting part 320 composed of a plurality of unit prisms 310 is unitarily formed with the base film 300. More particularly, the light refracting part 320 is formed on the second surface of the base film 300 by press-forming a film used as the base film 300.

A ridge 302 of each of the unit prisms 310 of the light refracting part 320 has an inclination which is not perpendicular to nor parallel with a normal line 303 of the flat first surface 301.

The ridge 302 is defined as a line connecting the top points, i.e., the vertexes of the cross sections of each of the unit prisms 310. The normal line 303 refers to a line having the same inclination as a line perpendicular to the flat first surface 301 of the base film 300.

Referring again to FIG. 2, the respective ridges 302 of the plurality of unit prisms 310 are slanted at a predetermined inclination. The inclination of each of the ridges 302 is changed at a specific point, which will be defined as an inclination changing point 304.

Describing in more detail, in the first unit prism 310 arranged at the lowermost position in the drawing, a right portion from the inclination changing point 304 of the ridge makes an angle of $\theta_n$ with the normal line, and a left portion from the inclination changing point 304 of the ridge makes an angle of $\theta_{n+1}$ with the normal line. That is, the inclination of the ridge is changed at the inclination changing point 304. Here, $\theta_n$ and $\theta_{n+1}$ have different values from each other.

For example, if the left and right portions from the inclination changing point 304 of the ridge is symmetric with each other, the sum of $\theta_n$ and $\theta_{n+1}$ is 180 degrees.

As shown in FIG. 2, each of the unit prisms 310 has a single inclination changing point 304. The positions of the inclination changing points 304 are not overlapped with each other in the whole of unit prisms 310, and are arranged irregularly. Preferably, the unit prisms are arranged such that a line connecting the inclination changing points of the three adjacent unit prisms is not a straight line. This is because if the three adjacent inclination changing points are positioned on the same straight line, an unexpected pattern may be generated.

The reason for arranging the inclination changing points 304 irregularly without overlapping between the unit prisms 310 is to restrain undesired refraction of light which may occur due to an unexpected pattern generated in the prism sheet 30.

As described above, since the ridges 302 of the unit prisms 310 are designed to have a predetermined inclination, gaps are generated between the prism sheet 30 and a protective film or a polarized film, which is stacked on the prism sheet 30 to form the back light unit of the LCD device, and accordingly moisture existing in the back light unit can be smoothly discharged through the gaps.

Although it is illustrated in FIG. 2 that the ridge of each of the unit prisms 310 has only one inclination changing point 304, the number of the inclination changing point 304 of each of the unit prisms is not limited to one, and can be more increased.

However, if the number of the inclination changing points 304 is increased numerously, there are problems such that the positions of the inclination changing points 304 may be overlapped with each other between the unit prisms, or the inclination changing points 304 may form one regular pattern. Therefore, it is preferred that the upper limit of the number of the inclination changing points 304 is set to be a value of dividing a length of the unit prism by a value forty times larger than a height (h) of a starting point of the unit prism.

For example, on the assumption that the height (h) of the starting point of the unit prism 310 is 10 and the length of the unit prism 310 is 10,000, the value forty times larger than the height (h) equals to 400, and the maximum number of the inclination changing points equals to 25 (i.e., 10,000/400=25). Accordingly, under the above conditions, the number of the inclination changing points is in the range of 2 to 25.

In a case where the number of the inclination changing points 304 is two or more, it is preferable to avoid the overlapping of the positions of the inclination changing points 304 in the whole of unit prisms. Although partially overlapped, it is preferable to maintain an overlapping ratio in the range of 5 to 10% or less.

FIGS. 3 to 6 are perspective views showing various examples of the patterns of the ridges provided on the prism sheet 30 according to the embodiment of the present invention.

Figure 3:
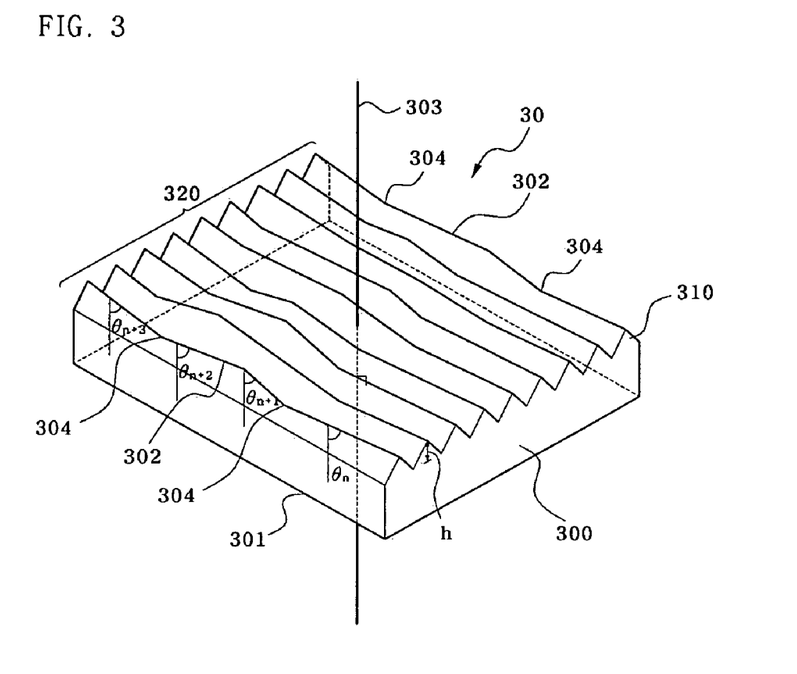
FIGS. 3 to 6 are perspective views showing various examples of patterns of ridges provided on the prism sheet 30 according to the embodiment of the present invention.
Figure 4:
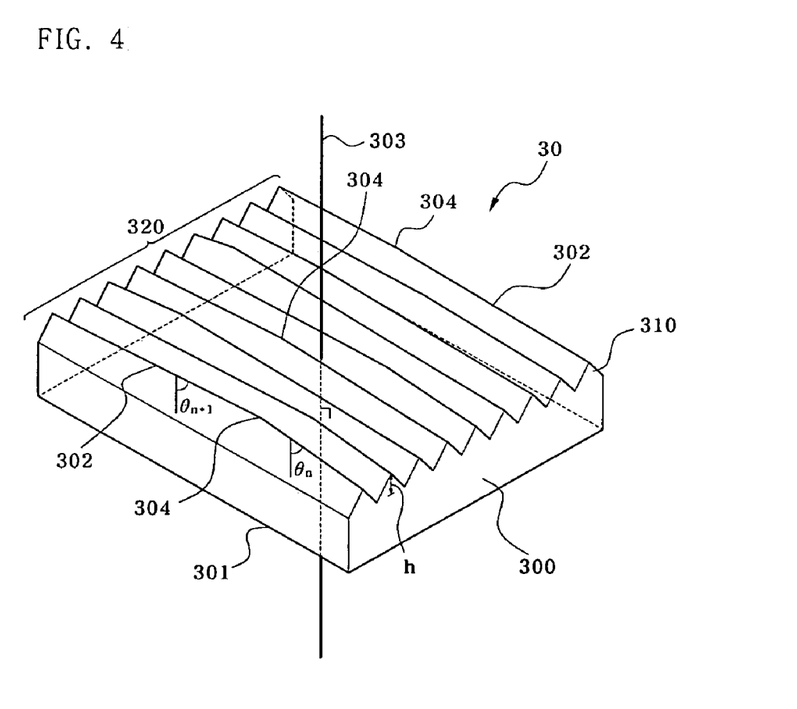
Figure 5:
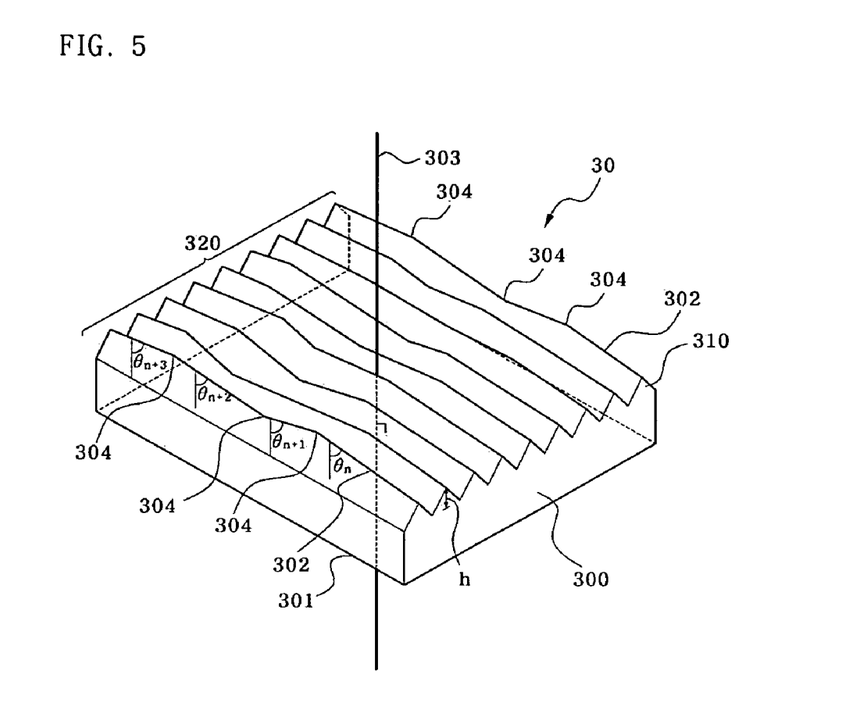
Figure 6:
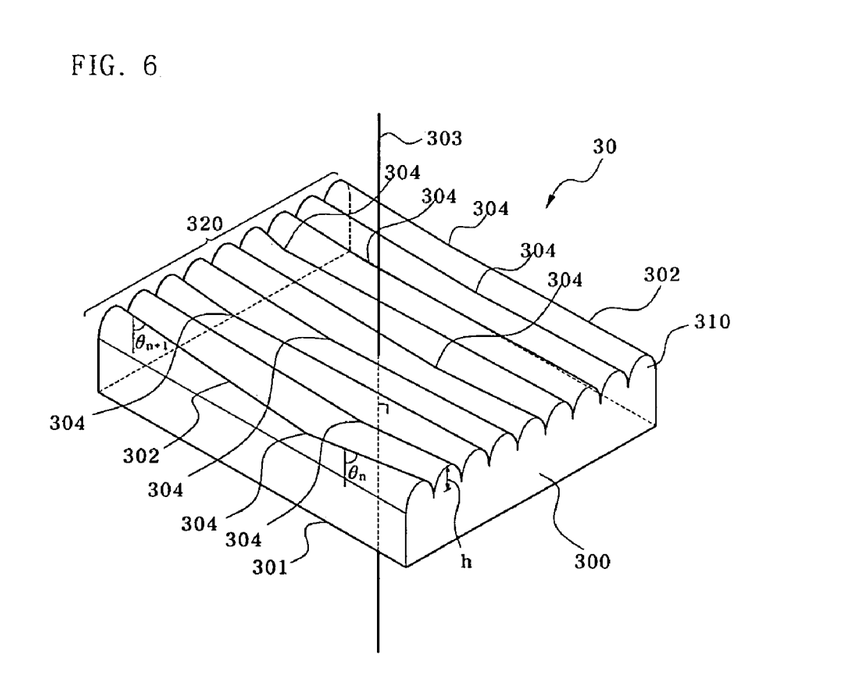

More particularly, FIG. 3 shows that the ridge 302 of each of the unit prisms 310 is formed with three inclination changing points 304. FIG. 4 shows that the ridge 302 of each of the unit prisms is formed in a reverse V shape (the ridge 302 shown in FIG. 2 is formed in a V shape). FIG. 5 shows that the ridge 302 of each of the unit prisms is formed in a reverse V shape and has three inclination changing points 304. FIG. 6 shows that each of the unit prisms 310 is formed in a lenticular shape having a semicircular cross section and the ridge of each of the unit prisms has one inclination changing point 304.

Referring again to FIG. 2, the plurality of unit prisms 310 of the light refracting part 320 are arranged in one direction, and are formed successively without a gap therebetween.

However, in a case where straightness of light is more required rather than refraction of light, flat planes may be formed between the unit prisms 310. In other words, the unit prisms 310 may be arranged with a regular gap therebetween, instead of densely.

It is preferred that a height of each of the unit prisms 310 (because the height of each of the unit prisms is not uniform, the height is defined as an average height) is set to be a range of 50% to 150% of a pitch (p). For example, when the pitch is 60 μm, the height of the unit prism is set to be a range of 30 μm to 90 μm. When the unit prism 310 has a triangle-shaped cross section, a vertex angle (θ) is preferably in the range of 30 to 120 degrees.

Figure 7:
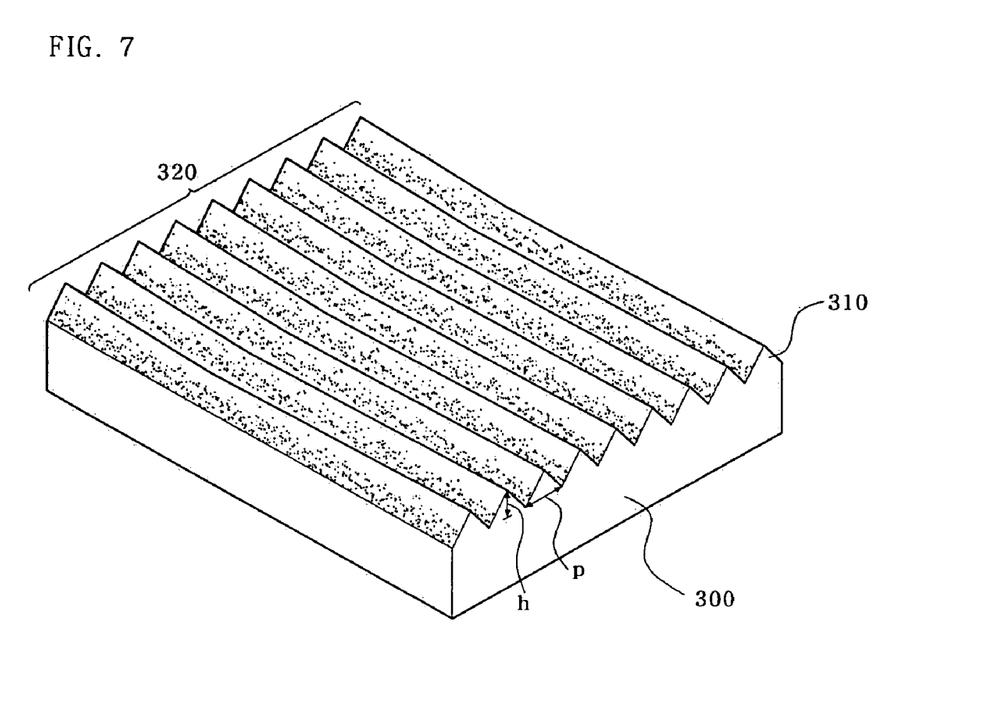
FIG. 7 is a view showing an example in which light diffusing elements are provided on the prism sheet according to the present invention to have a light diffusing property in addition to a light refracting property.
Figure 8:
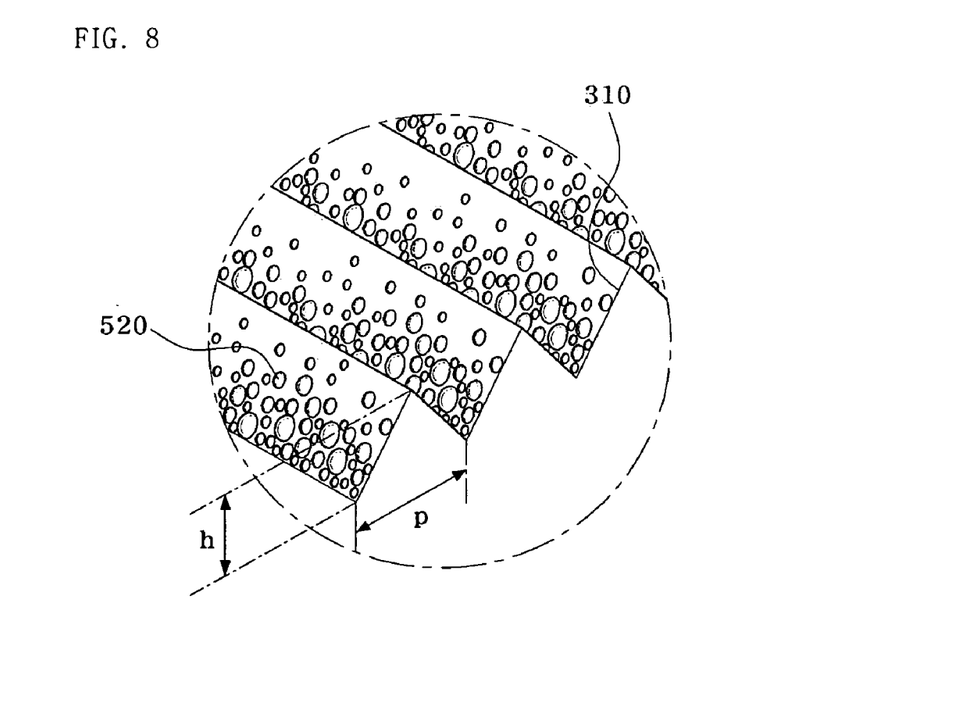
FIG. 8 is an enlarged view of an "A" portion in FIG. 7.

FIG. 7 is a view showing an example in which light diffusing elements are provided on the prism sheet to have a light diffusing property in addition to a light refracting property, and FIG. 8 is an enlarged view of an "A" portion in FIG. 7.

Referring to FIGS. 7 and 8, light diffusing elements 520 are irregularly distributed on a lower portion of the light refracting part 320, i.e., lower portions of valleys formed between the adjacent unit prisms 310. The light diffusing elements 520 are configured as circle-shaped lenses, oval-shaped lenses, or both the circle-shaped and oval-shaped lenses.

The light diffusing elements 520 cover the surface of the light refracting part 320 in such a manner that a plurality of lens-shaped elements having a round end surface are distributed in contact with each other or apart from each other in a concave-convex form on the lower portions of the unit prisms 310.

At this time, a size of the oval lens of the light diffusing element 520 should be smaller than a size of a light refracting portion. More particularly, when the light diffusing element 520 is configured as a circular lens, a ratio of a diameter of the lens to a pitch (P) of the prisms (diameter/pitch ratio) is preferably in the range of 0.01 to 0.9. When the light diffusing element 520 is configured as an oval lens, a ratio of a long diameter of the lens to the pitch (P) of the prisms (long diameter/pitch ratio) is preferably in the range of 0.01 to 0.9. And, a ratio of a height of the light diffusing portion to a height of the light refracting portion is preferably in the range of 0.01 to 0.9.

The above numerical ranges are determined in consideration of the light diffusing effect and the light refracting feature of the light diffusing portion.

The light diffusing elements 520 are formed to diffuse the light, transmitting through the base film 300 and the light refracting part 320, from the surface of the light refracting part 320 by a very small amount (here, to diffuse the light by a very small amount means to diffuse the light maximally to the ambient while maintaining a brightness reduction ratio of the refracted light in the range of approximately 5 to 10%).

It is preferred that at least 50% of the light diffusing elements 520 are distributed on the valley surfaces between the unit prisms 310, especially regions under a half of the height (h) of the unit prism 310 of the light refracting part 320.

The above distribution density is obtained from the following reason. The prism sheet of the present invention is manufactured by use of a mold having a shape opposite to the prism sheet, i.e., having a recessed pattern. At this time, if the surface of the mold, which has the shape opposite to the light refracting part 320, is treated by a sandblast method, mountain portions of the mold are severely damaged. If the prism sheet is manufactured by use of the mold treated thus, the mountain portions of the mold create the valley portions of the prism sheet, which results in the concentration of the light diffusing elements 520 on the valley portions of the prism sheet.

Although it has been described in FIGS. 7 and 8 that the light diffusing elements 520 are configured as the circle-shaped lenses, the light diffusing elements 520 may be configured as the oval-shaped lenses or both the circle-shaped and oval-shaped lenses.

In general, the light refracting part 320 is manufactured in such a manner that the mold having a recessed pattern is pressed to a transparent film having a uniform thickness to form an embossed prism shape, corresponding to the recessed pattern, on the surface of the transparent film. At this time, the upper surface of the transparent film becomes the light refracting part 320 having the prism shape, and the lower surface of the transparent film becomes the base film 300.

Therefore, as suggested above, in order to simultaneously form the light refracting part 320 and the light diffusing elements 520 in the manufacturing process of the prism sheet, concave-convex portions are formed on the surface of the mold having the recessed pattern, and a pressing process is carried out by use of such a mold. As a result, it is possible to manufacture the prism sheet configured such that the light refracting part 320 and the light diffusing elements 520 are unitarily formed.

The above-described prism sheet is used to be deposited on the surface of the light guide plate, from which the light progresses. By use of the prism sheet formed with the light diffusing elements 520, a conventional diffusion sheet, which has been provided separately, can be eliminated.

The prism sheet of the present invention can be applied to both an edge type LCD back light unit, in which the light source is disposed at a side surface of the light guide plate, and a direct type LCD back light unit, in which the light source is disposed at a lower surface of the light guide plate. Also, any one of a CCFL and an LED can be used as the light source.

Hereinafter, an experimental example will be explained, which proves that the light guide plate manufactured by using the prism sheet according to the embodiments of the present invention has good haze (which refers to the degree of light scattering), transmittance and wet-out properties. Since the non-described technical contents are well known to a person who is skilled in the art of the invention, explanation thereof will be omitted.

1. Experimental Example and Comparative Example

Experimental Example

A prism sheet was manufactured, in which the ridge of each of the plurality of unit prisms formed on the upper portion of the base film has one inclination changing point.

The prism sheet manufactured thus is configured such that a vertex angle of each of the unit prisms is 90 degrees, a pitch is 60 μm, a height of a starting point of each of the unit prisms is 30 μm, a height of the inclination changing point is about 28 μm on average, a depth of the inclination changing point is about 2 and the positions of the adjacent inclination changing points are arranged irregularly without overlapping.

Comparative Example

A prism sheet of a comparative example is the same as that of the above experimental example, except that a ridge connecting a starting point and an ending point of the unit prism is formed in a straight line instead of forming an inclination changing point at the ridge of the unit prism to have a predetermined inclination.

2. Measurement of Properties (1) Measurement of Surface Brightness

Center brightness of the prism sheet of the above experimental example and center brightness of the prism sheet of the above comparative example were compared by use of BM-7 manufactured by TOPCON corporation. The back light unit used at this time is for the use of a monitor, and has a model No. 170EU-L31.

(2) Measurement of Haze and Transmittance

Haze and transmittance were measured by use of NHD 5000W in such a condition that the surface of the prism shape is positioned below a detector of a measuring instrument and a pattern extending direction of the prism coincides with the detector.

(3) Measurement of Wet-Out performance

The prism sheets of the experimental example and the comparative example were cut such that the prism directions thereof are perpendicular to each other. The prism sheets cut thus were assembled in model no. BLU 154X3-L06 for use in a laptop computer which employs two prism sheets, such that the prism direction of a lower layer part is in a vertical direction of the back light unit and the prism direction of an upper layer part is in a horizontal direction of the back light unit. A test sample assembled thus was stored in a constant temperature and humidity chamber for 96 hours. Then, the test sample was inspected to determine whether an exterior appearance thereof is in good condition.

At this time, the constant temperature and humidity chamber is kept in temperature of 60° C. and humidity of 75%.

3. Results of Measurement of Properties and Analysis

The following table 1 shows the results of the properties measured as described above.

TABLE 1

|  | Experimental Example | Comparative Example |
|---|---|---|
| Center Brightness (cd/m$^2$) | 5,548 | 5,531 |
| Transmittance (%) | 8.72 | 9.04 |
| Haze (%) | 89.21 | 89.78 |
| Wet-Out | Good | Mottle Occurred |

Referring to the above table 1, when the prism sheet is manufactured such that the ridge of each of the unit prisms has a predetermined inclination and is provided with the inclination changing point, identically to the experimental example of the present invention, it can be understood that the center brightness, transmittance and haze are little different from those of the comparative example.

On the other hand, it also can be understood from the table 1 that even when the prism sheet according to the experimental example of the present invention is stored in the humidity condition of substantially 75% for a long time, a problem of dew condensation or mottle on a light sheet of the back light unit due to the dew condensation does not occur. This proves that the prism sheet according to the present invention has a very excellent wet-out ability.

Although the preferred embodiments of the present invention have been shown and described with reference to the accompanying drawings and the table, the present invention is not limited to the above embodiments, and can be manufactured in various different forms. Those skilled in the art will appreciate that the present invention may be carried out in other specific ways than those set forth herein without departing from the spirit and essential characteristics of the present invention. The above embodiments are therefore to be construed in all aspects as illustrative and not restrictive.

The invention claimed is:

1. A prism sheet, comprising:
   a base film made of a transparent material, the base film having a flat first surface; and
   a light refracting part including a plurality of unit prisms unitarily formed with the base film at a second surface of the base film, opposite to the flat first surface, the unit prisms having a predetermined shape of a cross section and being oriented in a same direction, wherein:
   each of the unit prisms has a ridge that has an inclination changing point at which a first inclined portion of the ridge meets a second inclined portion of the ridge, the first inclined portion of the ridge is inclined at a first angle that is greater than 0° and less than 90° relative to a line perpendicular to the flat first surface, and
   the second inclined portion of the ridge is inclined at a second angle that is greater than 0° and less than 90° relative a line perpendicular to the flat first surface, and the first angle is not equal to the second angle.

2. The prism sheet according to claim 1, wherein the ridge of each of the unit prisms has one inclination changing point,
   and wherein the inclination changing points of the adjacent unit prisms are disposed at different distances from end points in a longitudinal direction of the respective unit prisms.

3. The prism sheet according to claim 1, wherein the ridge of each of the unit prisms has one inclination changing point,
   and wherein the inclination changing points of three adjacent unit prisms are arranged such that a line connecting the inclination changing points is not a straight line.

4. The prism sheet according to claim 1, wherein the ridge of each of the unit prisms has inclination changing points more than two and less than a value of dividing a length of each of the unit prisms by a value forty times larger than a height of a starting point of each of the unit prisms,
   and wherein positions of the inclination changing points are arranged irregularly without overlapping with each other in the whole of unit prisms.

5. The prism sheet according to claim 1, wherein the ridge of each of the unit prisms is formed in a V shape or a reverse V shape.

6. The prism sheet according to claim 1, wherein the base film is made of a transparent synthetic resin material.

7. The prism sheet according to claim 1, wherein each of the unit prisms has at least two optical planes capable of refracting light,
   and wherein at least one pair of surfaces of the optical planes are not parallel with each other.

8. The prism sheet according to claim 1, wherein each of the unit prisms has a cross section of a triangle shape, a semicircle shape or a trapezoid shape.

9. The prism sheet according to claim 1, wherein the plurality of unit prisms are formed successively without a gap therebetween.

10. The prism sheet according to claim 1, wherein the plurality of unit prisms are arranged with a flat plane therebetween at regular intervals.

11. The prism sheet according to claim 1, wherein each of the unit prisms has a predetermined height from the flat first surface,
    and wherein the height is in the range of 50% to 150% of a pitch of the unit prisms.

12. The prism sheet according to claim 1, wherein each of the unit prisms has a triangle-shaped cross section,
    and wherein a vertex angle of each of the unit prisms is in the range of 30 to 120 degrees.

13. The prism sheet according to claim 1, wherein the unit prisms are provided with light diffusing elements formed unitarily at valley portions between the adjacent unit prisms to diffuse light,
    and wherein the light diffusing elements are distributed irregularly on valley surfaces of the unit prisms.

14. The prism sheet according to claim 13, wherein at least 50% of the light diffusing elements are distributed on the valley surfaces of regions under a half of a height of each of the unit prisms.

15. The prism sheet according to claim 13, wherein the light diffusing elements are formed in a circular lens shape,
    and wherein the lens shape has a diameter of 0.01 to 0.9 times a pitch of the unit prisms.

16. The prism sheet according to claim 13, wherein the light diffusing elements are formed in an oval lens shape,
    and wherein the lens shape has a long diameter of 0.01 to 0.9 times a pitch of the unit prisms.

17. An LCD back light unit comprising:
    a light guide plate;
    a light source disposed at a side surface or a rear surface of the light guide plate; and
    the prism sheet according to claim 1, the prism sheet being formed on a surface of the light guide plate, from which light progresses.

18. An LCD device comprising:
    a panel part including an upper substrate formed with a color filter and a lower substrate formed with a TFT; and
    the back light unit according to claim 17, the back light unit being mounted under the lower substrate.

* * * * *